Patented May 13, 1930

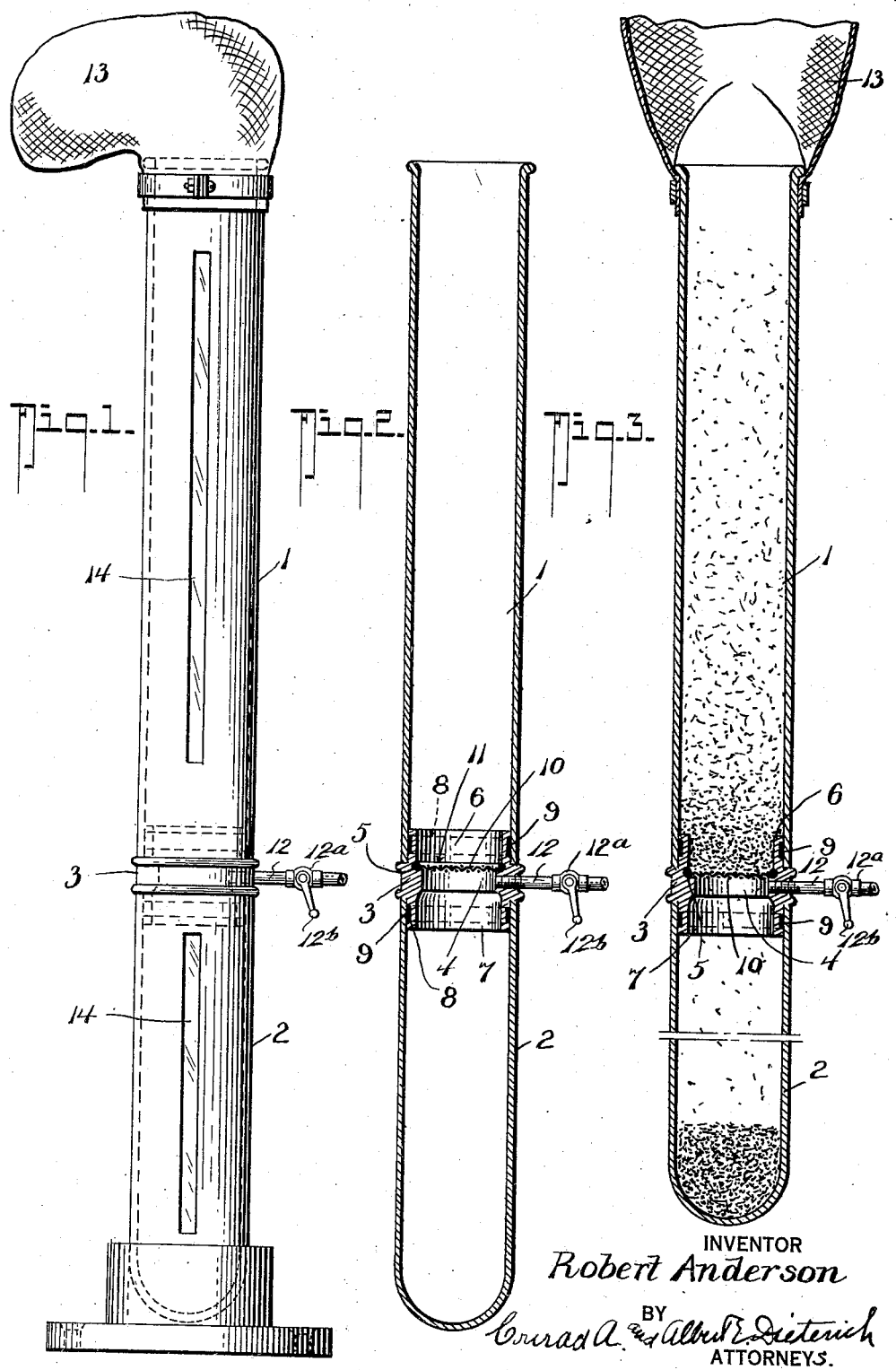

1,758,422

UNITED STATES PATENT OFFICE

ROBERT ANDERSON, OF NEW YORK, N. Y.

APPARATUS FOR SEPARATING COMMINUTED MATTER

Application filed June 12, 1928. Serial No. 284,685.

My invention relates to means for separating solid matter from foreign matter, and the same has for its object to provide a simple, efficient and inexpensive apparatus for separating or recovering precious metals or other valuable substances from foreign matter with which the same may be mixed.

Further, said invention has for its object to provide an apparatus for separating and recovering precious metals or ores such as gold, platinum, silver and other valuable substances from sweepings or other foreign matter present in a state of fine subdivision.

Further, said invention has for its object to separate and recover from a mass of comminuted matter the heavier or valuable constituents by separating the same from the lighter components of the mixture by subjecting the mixture to a series of air blasts whereby the lighter material is caused to be elevated from the heavier, and the latter then permitted to drop by gravity into a suitably disposed collecting receptacle.

Further, said invention has for its object to provide an apparatus consisting essentially of two receptacles arranged one above the other and united by an intermediate member provided with a separating screen, and with means for intermittently admitting air thereto whereby to keep the matter initially disposed in the upper receptacle in a state of agitation in order to separate the lighter from the heavier or valuable components of the mixture, and to permit said heavier or valuable components to drop through said screen and into the lower or collecting receptacle.

Further, said invention has for its object to provide an apparatus of the character described in which the several parts are so arranged and constructed that none of the material from which the valuable matter is to be recovered will be carried over by the air blast and lost.

Other objects will in part be obvious and in part be pointed out hereinafter.

To the attainment of the aforesaid objects and ends, my invention consists in the novel features of construction and in the combination, connection and arrangement of parts, hereinafter more fully described and then pointed out in the claims.

In the accompanying drawings, showing illustrative embodiments of the invention, Figure 1 is a side elevation of one form of embodiment of the invention;

Figure 2 is a vertical longitudinal section of part of the same, and

Figure 3 is a view similar to Figure 2 showing the materials placed in the apparatus and undergoing separation.

In the drawings, in which like numerals of reference indicate like parts in all the figures, 1 represents the upper vessel which forms the agitating and separating chamber. The vessel 1 is united to the lower vessel 2 by an intermediate body or union element 3, and the whole supported in a base or pedestal 15.

The lower vessel 2 is designed to serve as a receiver for the valuable materials separated from the mixture placed in the upper vessel 1 as will hereinafter more clearly appear.

The union element 3 has a throat 4 which is provided with a seat 5 for the screen 10 which may be secured in any suitable way as for example by a split ring 11.

The union element 3 has an upper flange 6 over which the upper vessel 1 is fitted, and a lower flange 7 which fits into the open upper end of the lower vessel 2.

Suitable packing rings 9 may be, and preferably are, provided on the exterior of the flanges 6 and 7 to effect air tight seals between the members 1, 3 and 2. The said packing rings 9 are placed in suitably located grooves 8 provided in the flanges 6 and 7, respectively.

12 denotes an air supply pipe leading from an impulse air pump (not shown) and discharging into the throat 4 beneath the screen 10. The pipe 12 is provided with a valve $12^a$ having a suitable operating handle or lever $12^b$ whereby the same may be actuated to cause an intermittent flow of air therethrough. As there is no outlet to the chamber 2 it necessarily follows that the air will be forced upwardly through the screen 10 and into the vessel 1 to its upper or outlet end, and, in order to prevent discharge of any of the materials into the atmosphere, the upper end of the vessel 1 is preferably provided with a dust bag 13 of close mesh fabric, or other suitable means which will permit of the passage of air therethrough, but will prevent of any solid matter passing therethrough.

When the vessels 1 and 2 are made of opaque material it is preferable to provide the same with sight openings having transparent sections or windows 14 through which the operation may be observed.

In the practical construction of my invention I find that by making the length of the vessel 1 about six times its diameter satisfactory results are obtainable. Of course, the depth of the vessel 2 is not material. It should however be large enough to hold a considerable quantity of the recovered material in order to avoid the frequent emptying of the vessel 2.

The sweepings or matter from which the gold or platinum filings or particles are to be separated is placed within the vessel 1, and the dust bag 13 secured over the upper end of said vessel. The air pumped into the throat 4 of the union element 3 passes upwardly through the mass within the vessel 1 in a succession of more or less rapid puffs, thereby producing an intermittent stream of air passing upwardly through the vessel 1. The interruptions in the flow of air are sufficient to permit the settling of the material, and the impulses or blasts of sufficient force to cause the lighter material to separate from the heavier, and said heavier materials to gravitate through the screen into the collection chamber of the vessel 1. After the vessel 2 has been filled with recovered matter it may be detached from the member 3, emptied and replaced, or another vessel 2 substituted immediately in order to avoid any considerable interruption in the continued use of the apparatus. Of course, when the vessel 2 is being removed the air stream will be cut off from flowing into the throat 4 by means of the suitable valve 12$^a$ in the pipe 12.

Having thus described my invention, what I claim and desire to secure by Letters Patent is:

1. An apparatus for the separation of comminuted matter including elements of different specific gravities; said apparatus comprising an upper vessel having an outlet and a lower vessel, a tubular coupling between said vessels having a throat, a screen located in said coupling above said throat, means at outlet of said upper vessel for permitting the passage of air therethrough and for preventing the passage of any solid matter, and means for forcing air through the wall of said coupling into said upper vessel via said screen, substantially as specified.

2. An apparatus for the separation of comminuted matter including elements of different specific gravities; said apparatus comprising an upper vessel and a lower vessel, a coupling between said vessels, said coupling comprising a tubular body having a restricted throat between its ends constituting a screen seat and having a groove above said seat, a screen on said seat, a screen retaining ring in said groove, a pipe entering said coupling throat between the vessels and beneath said screen, through which pipe air may be forced into said coupling and through said screen upwardly, said lower vessel being closed to escape of air save through said coupling.

3. In an apparatus for the separation of comminuted matter including elements of different specific gravities; said apparatus comprising a lower tubular vessel having an opening in its upper end only, an upper tubular vessel open at both ends, a tubular coupling adapted to be inserted into the adjacent ends of said vessels to couple them together, said coupling having packing ring seats and packing rings in said seats, said coupling having a screen seat, a screen located on said screen seat, a pipe for delivering air through the wall of said coupling into the coupling below the screen, and an air passing filter bag fitted over the upper end of the upper vessel for the purpose specified.

Signed at the city of New York, borough of Manhattan, in the county and State of New York, this 29th day of May one thousand nine hundred and twenty-eight.

ROBERT ANDERSON.